US012682181B2

(12) United States Patent     (10) Patent No.:   US 12,682,181 B2
Nguyen et al.              (45) Date of Patent:     Jul. 14, 2026

(54) MULTIMODAL DIALOGS USING LARGE LANGUAGE MODEL(S) AND VISUAL LANGUAGE MODEL(S)

(71) Applicant: GOOGLE LLC, Mountain View, CA (US)

(72) Inventors: Tuan Nguyen, San Jose, CA (US); Sergei Volnov, London (GB); William A. Truong, San Jose, CA (US); Yunfan Ye, Sunnyvale, CA (US); Sana Mithani, Plantation, FL (US); Neel Joshi, Newcastle, WA (US); Alexey Galata, San Jose, CA (US); Tzu-Chan Chuang, San Francisco, CA (US); Liang-yu Chen, Sunnyvale, CA (US); Qiong Huang, San Jose, CA (US); Krunal Shah, Mountain View, CA (US); Sai Aditya Chitturu, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 189 days.

(21) Appl. No.: 18/217,313

(22) Filed: Jun. 30, 2023

(65) Prior Publication Data

US 2025/0005293 A1     Jan. 2, 2025

(51) Int. Cl.
    *G06F 40/40*        (2020.01)
    *G06F 40/30*        (2020.01)
          (Continued)

(52) U.S. Cl.
    CPC ............. *G06F 40/40* (2020.01); *G06F 40/30* (2020.01); *G06F 40/35* (2020.01); *G06V 10/82* (2022.01)

(58) Field of Classification Search
    CPC .......... G06F 40/40; G06F 40/35; G06F 40/30; G06V 10/82
    See application file for complete search history.

(56) References Cited

U.S. PATENT DOCUMENTS 8,799,000 B2 *   8/2014   Guzzoni  ................ G06N 5/022
                                  709/224
9,614,690 B2 *   4/2017   Ehsani  .............. H04M 1/72415
         (Continued)

OTHER PUBLICATIONS

Zeng, Andy, Maria Attarian, Brian Ichter, Krzysztof Choromanski, Adrian Wong, Stefan Welker, Federico Tombari et al., "Socratic Models: Composing Zero-Shot Multimodal Reasoning with Language", May 2022, arXiv preprint arXiv:2204.00598. (Year: 2022).*
(Continued)

*Primary Examiner* — Daniel C Washburn
*Assistant Examiner* — James Boggs
(74) *Attorney, Agent, or Firm* — Gray Ice Higdon

(57) ABSTRACT

Implementations relate to leveraging large language model(s) (LLMs) and vision language model(s) (VLMs) to facilitate human-to-computer dialogs. In various implementations, one or more digital images may be processed using one or more VLMs to generate VLM output indicative of a state of an environment. An LLM prompt may be assembled based on the VLM output and a natural language input. The LLM prompt may be processed using one or more LLMs to generate content that is responsive to the natural language input. The content that is responsive to the natural language input may subsequently be rendered at one or more output devices.

16 Claims, 7 Drawing Sheets

(51) Int. Cl.
G06F 40/35 (2020.01)
G06V 10/82 (2022.01)

(56) References Cited

U.S. PATENT DOCUMENTS 11,803,710 B1 * 10/2023 Love ..................... G06V 10/96
2023/0394855 A1 * 12/2023 Xie ......................... G06F 40/40

OTHER PUBLICATIONS

Yang, Zhengyuan, Linjie Li, Jianfeng Wang, Kevin Lin, Ehsan Azarnasab, Faisal Ahmed, Zicheng Liu, Ce Liu, Michael Zeng, and Lijuan Wang, "MM-REACT: Prompting ChatGPT for Multimodal Reasoning and Action", Mar. 2023, arXiv preprint arXiv: 2303.11381. (Year: 2023).*

Gao, Difei, Lei Ji, Luowei Zhou, Kevin Qinghong Lin, Joya Chen, Zihan Fan, and Mike Zheng Shou, "AssistGPT: A General Multimodal Assistant that can Plan, Execute, Inspect, and Learn", Jun. 28, 2023, arXiv preprint arXiv:2306.08640. (Year: 2023).*

Hu, Ziniu, Ahmet Iscen, Chen Sun, Kai-Wei Chang, Yizhou Sun, David A. Ross, Cordelia Schmid, and Alireza Fathi, "AVIS: Autonomous Visual Information Seeking with Large Language Model Agent", Jun. 13, 2023, arXiv preprint arXiv:2306.08129. (Year : 2023).*

Liu, Zhaoyang, Yinan He, Wenhai Wang, Weiyun Wang, Yi Wang, Shoufa Chen, Qinglong Zhang et al., "InternGPT: Solving Vision-Centric Tasks by Interacting with ChatGPT Beyond Language", Jun. 2, 2023, arXiv preprint arXiv:2305.05662. (Year: 2023).*

Pi, Renjie, Jiahui Gao, Shizhe Diao, Rui Pan, Hanze Dong, Jipeng Zhang, Lewei Yao et al., "DetGPT: Detect What You Need via Reasoning", May 2023, arXiv preprint arXiv:2305.14167. (Year: 2023).*

Yang, Rui, Lin Song, Yanwei Li, Sijie Zhao, Yixiao Ge, Xiu Li, and Ying Shan, "GPT4Tools: Teaching Large Language Model to Use Tools via Self-instruction", May 2023, arXiv preprint arXiv:2305.18752. (Year: 2023).*

Zhu, Deyao, Jun Chen, Xiaoqian Shen, Xiang Li, and Mohamed Elhoseiny, "MiniGPT-4: Enhancing Vision-Language Understanding with Advanced Large Language Models", Apr. 2023, arXiv preprint arXiv:2304.10592. (Year: 2023).*

Driess, Danny, Fei Xia, Mehdi SM Sajjadi, Corey Lynch, Aakanksha Chowdhery, Brian Ichter, Ayzaan Wahid et al., "PaLM-E: An Embodied Multimodal Language Model", Mar. 2023, arXiv preprint arXiv:2303.03378 (2023). (Year: 2023).*

Wu, Chenfei, Shengming Yin, Weizhen Qi, Xiaodong Wang, Zecheng Tang, and Nan Duan, "Visual ChatGPT: Talking, Drawing and Editing with Visual Foundation Models", Mar. 2023, arXiv preprint arXiv:2303.04671. (Year: 2023).*

Chen, Zhenfang, Qinhong Zhou, Yikang Shen, Yining Hong, Hao Zhang, and Chuang Gan, "See, Think, Confirm: Interactive Prompting Between Vision and Language Models for Knowledge-based Visual Reasoning", arXiv e-prints, Jan. 2023, arXiv preprint arXiv:2301.05226. (Year: 2023).*

Hakimov, Sherzod, and David Schlangen, "Images in Language Space: Exploring the Suitability of Large Language Models for Vision & Language Tasks", May 2023, arXiv preprint arXiv:2305.13782. (Year: 2023).*

Zeng, A. et al. "Socratic Models: Composing Zero-Shot Multimodal Reasoning with Language"; arXiv.org, Cornell University; arXiv:2204.00598; 30 pages; dated 2022.

Ahn, M. et al., "Do as I Can, Not as I Say: Grounding Language in Robotic Affordances"; arXiv.org, Cornell University; arXiv:2204.01691v2; 34 pages; dated Aug. 16, 2022.

Liang, Y. et al., "TaskMatrix.AI: Completing Tasks by Connecting Foundation Models with Millions of APIs"; arXiv.org, Cornell University; arXiv:2303.16434; 27 pages; dated Mar. 29, 2023.

King, E. et al., "Get ready for a party": Exploring smarter smart spaces with help from large language models; arXiv.org, Cornell University; arXiv:2303.14143; 7 pages; dated Mar. 24, 2023.

European Patent Office; International Search Report and Written Opinion issued in Application No. PCT/US2024/030374; 14 pages; dated Sep. 16, 2024.

Dirik et al., "A Dive into Vision-Language Models" Hugging Face. Retrieved from https://huggingface.co/blog/vision_language_pretraining, 21 pages, dated Feb. 3, 2023.

Alayrac et al., "Flamingo: a Visual Language Model for Few-Shot Learning" arXiv:2204.14198v2 [cs.CV] 54 pages, dated Nov. 15, 2022.

Chen et al., "PaLl: A Jointly-Scaled Multilingual Language-Image Model" arXiv:2209.06794v2 [cs.CV] 30 pages, dated Sep. 16, 2022.

* cited by examiner

500

PROCESS DIGITAL IMAGE(S) USING VLM(S) TO GENERATE VLM OUTPUT INDICATIVE OF STATE OF ENVIRONMENT
502

ASSEMBLE LLM PROMPT BASED ON THE VLM OUTPUT AND A NL INPUT
504

PROCESS LLM PROMPT USING LLM(S) TO GENERATE CONTENT THAT IS RESPONSIVE TO NL INPUT
506

CAUSE RESPONSIVE CONTENT TO BE RENDERED AT OUTPUT DEVICE(S)
508

600

```
┌────────────────────────────────────────────────────────────────────┐
│                     RECEIVE AMBIGUOUS NL INPUT                      │
│                              602                                   │
└────────────────────────────────────────────────────────────────────┘
                                 │
                                 ▼
┌────────────────────────────────────────────────────────────────────┐
│  PROCESS AMBIGUOUS NL INPUT USING LLM(S) TO GENERATE SYNTHETIC      │
│                        FOLLOW-UP QUERY                              │
│                              604                                   │
└────────────────────────────────────────────────────────────────────┘
                                 │
                                 ▼
┌────────────────────────────────────────────────────────────────────┐
│  ASSEMBLE VLM PROMPT BASED ON SYNTHETIC FOLLOW-UP QUERY AND DIGITAL │
│                            IMAGE(S)                                 │
│                              606                                   │
└────────────────────────────────────────────────────────────────────┘
                                 │
                                 ▼
┌────────────────────────────────────────────────────────────────────┐
│  PROCESS VLM PROMPT USING VLM(S) TO GENERATE VLM OUTPUT INDICATIVE  │
│                     OF STATE OF ENVIRONMENT                         │
│                              608                                   │
└────────────────────────────────────────────────────────────────────┘
                                 │
                                 ▼
┌────────────────────────────────────────────────────────────────────┐
│       ASSEMBLE LLM PROMPT BASED ON THE VLM OUTPUT AND NL INPUT      │
│                              610                                   │
└────────────────────────────────────────────────────────────────────┘
                                 │
                                 ▼
┌────────────────────────────────────────────────────────────────────┐
│  PROCESS LLM PROMPT USING LLM(S) TO GENERATE CONTENT THAT IS        │
│                     RESPONSIVE TO NL INPUT                          │
│                              612                                   │
└────────────────────────────────────────────────────────────────────┘
                                 │
                                 ▼
┌────────────────────────────────────────────────────────────────────┐
│   CAUSE RESPONSIVE CONTENT TO BE RENDERED AT OUTPUT DEVICE(S)       │
│                              614                                   │
└────────────────────────────────────────────────────────────────────┘
```

FIG. 6

MULTIMODAL DIALOGS USING LARGE LANGUAGE MODEL(S) AND VISUAL LANGUAGE MODEL(S)

BACKGROUND

Large language models (LLMs) are particular types of machine learning models—sometimes referred to as "generative models"—that can perform various natural language processing (NLP) tasks, such as language generation, machine translation, and question-answering. These LLMs are typically trained on enormous amounts of diverse data including data from, but not limited to, webpages, electronic books, software code, electronic news articles, and machine translation data. Accordingly, these LLMs leverage the underlying data on which they were trained in performing these various NLP tasks. For instance, in performing a language generation task, these LLMs can process a natural language (NL) based input that is received from a client device, and generate a NL based output that is responsive to the NL based input and that is to be rendered at the client device.

Vision language models (VLMs, also referred to as "visual language models") are another type of machine learning model that can be used to perform tasks based on multiple modalities of data, particularly visual data (e.g., digital images) in combination with NL. VLMs may be trained to facilitate performance of a variety of different tasks, such as visual question answering, text-guided image manipulation, and image captioning, to name a few. With visual question answering, for instance, input image(s) and NL question(s) about the image(s) may be assembled into a prompt that is then processed using a VLM to generate an output sequence indicative of answer(s) to the question(s).

SUMMARY

While visual cues have been used to invoke or "awaken" automated assistants, sometimes in combination with hot words or phrases, visual data has not typically been incorporated into ongoing conversations with automated assistants after invocation. Accordingly, implementations are described herein for combining LLMs and VLMs to facilitate multi-modal engagement and continued conversation with an automated assistant (also referred to as a "virtual assistant" or "chatbot"). More particularly, but not exclusively, techniques are described herein for using prompt engineering to exchange multiple modalities of data between LLMs and VLMs, e.g., by using LLM output to prompt the VLM, and/or vice versa.

In some implementations, a method may be implemented using one or more processors and may include: processing one or more digital images using one or more VLMs to generate VLM output indicative of a state of an environment; assembling an LLM prompt based on the VLM output and a natural language input; processing the LLM prompt using one or more LLMs to generate content that is responsive to the natural language input; and causing the content that is responsive to the natural language input to be rendered at one or more output devices.

In various implementations, the natural language input may be ambiguous, and the method may include processing the ambiguous natural language input using one or more of the LLMs to generate a synthetic follow-up query, which may seek information that is usable to resolve the ambiguous natural language input. In various implementations, the method may include assembling a VLM prompt based on the synthetic follow-up query and the one or more digital images. Processing the one or more digital images using one or more VLMs may include processing the VLM prompt using one or more VLMs to generate the VLM output indicative of the state of the environment.

In various implementations, the synthetic follow-up query may seek information about one or more items that are present in the environment. In various implementations, the information may include one or more physical attributes of one or more of the items that are present in the environment. In various implementations, the information may include one or more locations of one or more of the items within the environment.

In various implementations, the method may include detecting, based on one or more sensor signals, that an individual is present in the environment, wherein the one or more digital images are processed based on the VLM responsive to the detecting. In various implementations, the LLM prompt may include embeddings generated from the VLM output indicative of the state of the environment and the natural language input. In various implementations, the LLM prompt may include a sequence of natural language tokens assembled from the VLM output indicative of the state of the environment and the natural language input.

In a related aspect, a method implemented using one or more processors may include: receiving an ambiguous natural language input; processing the ambiguous natural language input using one or more LLMs to generate a synthetic follow-up query, wherein the synthetic follow-up query seeks information that is usable to resolve the ambiguous natural language input; assembling a VLM prompt based on the synthetic follow-up query and one or more digital images; processing the VLM prompt using one or more VLMs to generate VLM output indicative of a state of an environment; assembling an LLM prompt based on the VLM output the ambiguous natural language input; processing the LLM prompt using one or more of the LLMs to generate content that is responsive to the ambiguous natural language input; and causing the content that is responsive to the ambiguous natural language input to be rendered at one or more output devices.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 6 depicts a flowchart illustrating another example method of practicing selected aspects of the present disclosure, in accordance with various implementations.

DETAILED DESCRIPTION OF THE DRAWINGS

Figure 1:
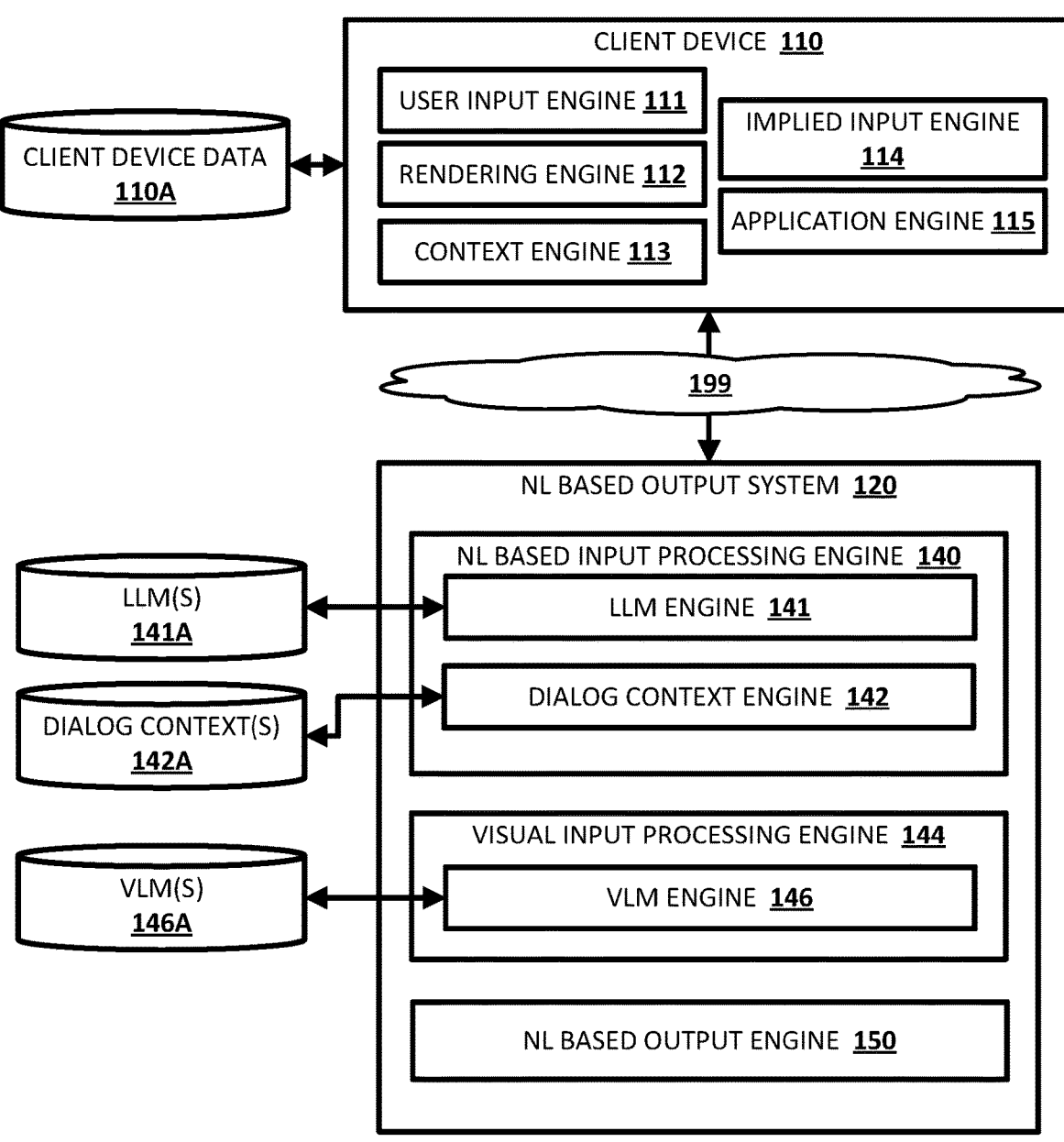
FIG. 1 depicts a block diagram of an example environment that demonstrates various aspects of the present disclosure, and in which some implementations disclosed herein can be implemented.

While visual cues have been used to invoke or "awaken" automated assistants, sometimes in combination with hot words or phrases, visual data has not typically been incorporated into ongoing conversations with automated assistants after invocation. Accordingly, implementations are described herein for combining LLMs and VLMs to facilitate multi-modal engagement and continued conversation with an automated assistant (also referred to as a "virtual assistant" or "chatbot"). More particularly, but not exclusively, techniques are described herein for using prompt engineering to exchange multiple modalities of data between LLMs and VLMs, e.g., by using LLM output to prompt the VLM, and/or vice versa.

In various implementations, visual data that provides context about an individual and/or the individual's environment may be obtained. For instance, digital images of an individual's environment may be captured by one or more vision sensors. These vision sensors may be integral with the individual's smartphone (e.g., front facing and rear facing cameras), integral with a standalone assistant device (with or without a display), or otherwise communicatively coupled with computing device(s) that facilitate interaction between the individual and an LLM-powered automated assistant. As another example, screenshots depicting the user's current activity on a device such as a smartphone or tablet may also be captured. These vision data may be processed using a VLM in order to generate visual-contextual information about the user and/or the user's environment, such as what activity the user is engaged in on a computing device, items present in the environment, spatial relationships between items, visual and/or spatial attributes of the environment itself, physical attributes of the item(s), visual attributes of the item(s), and so forth. This visual-contextual information may then be assembled, e.g., with NL input provided by the user, as an LLM prompt that is processed using an LLM to generate a response to the user's NL input that is augmented based on the contextual data about the user and/or the user's environment obtained from the VLM.

In some implementations, the VLM may be applied in response to an individual providing NL input, and in some cases the VLM may be prompted based on the individual's NL input. As one example, suppose the individual provides the NL input, "I need a good recipe for dinner tonight." This NL input may be processed, e.g., using an LLM, to generate one or more follow-up questions (also referred to herein as "synthetic follow-up queries"), answers to which may be necessary or helpful for responding to the individual's NL input. For instance, the individual's NL input may be processed based on the LLM to generate a synthetic follow-up query of "What food is available?"

This synthetic follow-up query ("What food is available?") may then be processed using the VLM, e.g., as a prompt that also includes one or more digital images of the individual's environment. Based on these inputs, the VLM may generate an output sequence of tokens that identifies any foods detected in the digital image(s). For instance, if the individual's refrigerator includes an interior camera, image(s) captured by the camera may be processed, e.g., as a prompt that also includes the synthetic follow-up query, using the VLM. The output token sequence generated by the VLM may be indicative of, for instance, food items detected in the digital image(s).

Suppose the VLM output identifies chicken within the refrigerator. In some implementations, that information may be assembled into an LLM prompt along with the individual's initial query, "I need a good recipe for dinner tonight." For example, an input sequence of tokens may be generated to represent the query, "I need a good chicken recipe for dinner tonight." Additionally or alternatively, other representations of the individual's initial query and/or VLM output, such as embeddings generated therefrom, may be used as input tokens for the LLM. Whichever the case, when the resulting LLM prompt is processed using the LLM, the LLM response may include information indicative of one or more chicken recipes, such as search results for chicken recipes, a NL description of a particular chicken recipe (e.g., the most popular or highest ranked that can be made using the ingredients the individual has on hand), etc.

In some implementations, the VLM may be applied to digital images under circumstances other than being triggered by individual engagement with the automated assistant. For instance, in some implementations, an assistant device may capture images at certain times, such as when someone is detected as being co-present with the assistant device, when a particular person (e.g., a registered user) is detected as co-present, constantly (if given user permission), etc. The VLM may be applied to these images on an ongoing basis (e.g., again with the user's permission) to generate a stream of contextual data about the environment. This stream may include, for instance, an ongoing textual description of the environment and/or events occurring in the environment, a sequence of visual feature embeddings or encodings generated by the VLM, and so forth. When an individual engages with the automated assistant, the contextual data generated using the VLM may be used to prime or condition the LLM, e.g., by being incorporated into a prompt with the individual's query.

In some implementations, the VLM or another machine learning model upstream of the VLM (e.g., a convolutional neural network (CNN) and/or image encoder) may be implemented at least in part on an edge device, rather than at the cloud. This may minimize exposure of individuals' potentially private images to the cloud. For instance, a distilled version of a fully functional VLM (e.g., with fewer weights, parameters that are quantized from continuous values to discrete values, etc.) may be implemented onboard a client device such as an assistant device or smartphone. This edge based VLM may be used to process images at the edge and locally generate derived data, such as detected items or events, visual features, physical attributes of item(s), etc. This derived data may then be assembled into an LLM prompt with other data, such as an individual's prompt to his or her automated assistant. The assembled prompt may then be processed using a cloud based LLM.

The techniques described herein provide a number of technical advantages. Images of an environment can be processed using the VLM to generate myriad contextual data about the environment. This contextual data may be used, e.g., along with other contextual cues (e.g., time of day, calendar information, activity information, sensor readings, etc.), in order to disambiguate and/or otherwise provide better responses to NL input. By providing better responses in fewer dialog turns, less computational resources such as memory, network bandwidth, etc., are consumed in order to fulfill an individual's query to his or her automated assistant. Moreover, using a VLM, as opposed to processing images using conventional object detection machine learning models, is far more robust and offers interrogation of individuals' environments in relatively few dialog turns.

Turning now to FIG. 1, a block diagram of an example environment that demonstrates various aspects of the present disclosure, and in which implementations disclosed herein can be implemented is depicted. The example environment includes a client device 110 and a natural language (NL) based output system 120, which is depicted separately in FIG. 1. In some implementations, all or aspects of the NL based output system 120 can be implemented locally at the client device 110. In additional or alternative implementations, all or aspects of the NL based output system 120 can be implemented remotely from the client device 110 as depicted in FIG. 1 (e.g., at remote server(s)). In those implementations, the client device 110 and the NL based output system 120 can be communicatively coupled with each other via one or more networks 199, such as one or more wired or wireless local area networks ("LANs," including Wi-Fi, mesh networks, Bluetooth, near-field communication, etc.) or wide area networks ("WANs", including the Internet).

The client device 110 can be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can execute one or more software applications, via application engine 115, through which NL based input can be submitted and/or NL based output and/or other output that is responsive to the NL based input can be rendered (e.g., audibly and/or visually). The application engine 115 can execute one or more software applications that are separate from an operating system of the client device 110 (e.g., one installed "on top" of the operating system)—or can alternatively be implemented directly by the operating system of the client device 110. For example, the application engine 115 can execute a web browser or automated assistant installed on top of the operating system of the client device 110. As another example, the application engine 115 can execute a web browser software application or automated assistant software application that is integrated as part of the operating system of the client device 110. The application engine 115 (and the one or more software applications executed by the application engine 115) can interact with the NL based output system 120.

In various implementations, the client device 110 can include a user input engine 111 that is configured to detect user input provided by a user of the client device 110 using one or more user interface input devices. For example, the client device 110 can be equipped with one or more microphones that capture audio data, such as audio data corresponding to spoken utterances of the user or other sounds in an environment of the client device 110. Additionally, or alternatively, the client device 110 can be equipped with one or more vision components that are configured to capture vision data corresponding to digital images and/or movements (e.g., gestures) detected in a field of view of one or more of the vision components. Additionally, or alternatively, the client device 110 can be equipped with one or more touch sensitive components (e.g., a keyboard and mouse, a stylus, a touch screen, a touch panel, one or more hardware buttons, etc.) that are configured to capture signal(s) corresponding to touch input directed to the client device 110.

Some instances of a NL based input described herein can be a query for a NL response that is formulated based on user input provided by a user of the client device 110 and detected via user input engine 111. For example, the query can be a typed query that is typed via a physical or virtual keyboard, a suggested query that is selected via a touch screen or a mouse of the client device 110, a spoken voice query that is detected via microphone(s) of the client device 110 (and optionally directed to an automated assistant executing at least in part at the client device 110), an image or video query that is based on vision data captured by vision component(s) of the client device 110 (or based on NL input generated based on processing the image using, for example, object detection model(s), captioning model(s), etc.), or any combination thereof. Other instances of a NL based input described herein can be a prompt for NL content that is formulated based on user input provided by a user of the client device 110 and detected via the user input engine 111. For example, the prompt can be a typed prompt that is typed via a physical or virtual keyboard, a suggested prompt that is selected via a touch screen or a mouse of the client device 110, a spoken prompt that is detected via microphone(s) of the client device 110, or an image prompt that is based on an image captured by a vision component of the client device 110.

In various implementations, the client device 110 can include a rendering engine 112 that is configured to render content (e.g., NL based output, an indication of source(s) associated with the NL based output, and/or other content) for audible and/or visual presentation to a user of the client device 110 using one or more user interface output devices. For example, the client device 110 can be equipped with one or more speakers that enable the content to be provided for audible presentation to the user via the client device 110. Additionally, or alternatively, the client device 110 can be equipped with a display or projector that enables the content to be provided for visual presentation to the user via the client device 110. In some implementations, rendering engine 112 or another component of client device 110 or NL based output system may be configured to, in addition to providing audio or visual output, control one or more "smart" (e.g., network connected) devices and/or appliances, such as smart lights, smart televisions, smart heating ventilation and air conditioning (HVAC) equipment, smart kitchen appliances, and so forth.

In various implementations, the client device 110 can include a context engine 113 that is configured to determine a context (e.g., current or recent context) of the client device 110 and/or of a user of the client device 110 (e.g., an active user of the client device 110 when the client device 110 is associated with multiple users). In some of those implementations, context engine 113 can determine a context based on data stored in client device data database 110A. The data stored in the client device data database 110A can include, for example, user interaction data that characterizes current or recent interaction(s) of the client device 110 and/or a user of the client device 110, location data that characterizes a current or recent location(s) of the client device 110 and/or a user of the client device 110, user attribute data that characterizes one or more attributes of a user of the client device 110, user preference data that characterizes one or more preferences of a user of the client device 110, user profile data that characterizes a profile of a user of the client device 110, and/or any other data accessible to the context engine 113 via the client device data database 110A or otherwise.

For example, the context engine 113 can determine a current context based on a current state of a dialog session (e.g., considering one or more recent inputs provided by a user during the dialog session), profile data, and/or a current location of the client device 110. For instance, the context engine 113 can determine a current context of "visitor looking for upcoming events in Louisville, Kentucky" based on a recently issued query, profile data, and an anticipated future location of the client device 110 (e.g., based on recently booked hotel accommodations). As another example, the context engine 113 can determine a current context based on which software application is active in the foreground of the client device 110, a current or recent state of the active software application, and/or content currently or recently rendered by the active software application. A context determined by the context engine 113 can be utilized, for example, in supplementing or rewriting NL based input that is formulated based on user input, in generating an implied NL based input (e.g., an implied query or prompt formulated independent of any explicit NL based input provided by a user of the client device 110), and/or in determining to submit an implied NL based input and/or to render result(s) (e.g., an NL based output) for an implied NL based input.

In some implementations, context engine 113 may be configured to process visual data, e.g., captured via user input engine 111, to extract various visual features that form part of a current context. For example, context engine 113 may process, or cause to be processed, images captured by one or more vision sensors onboard client device 110 to identify nearby items and/or arrangements of nearby items. In some implementations, context engine 113 may utilize a local or remote VLM engine (e.g., 146 in FIG. 1) to determine contextual information about an environment, e.g., in which client device 110 and/or a user thereof is present. The VLM engine 146 may be configured to process the digital images, by themselves or in combination with NL input, to generate VLM output indicative of a state of an environment, such as items that are present, arrangements of those items, and so forth.

In various implementations, the client device 110 can include an implied input engine 114 that is configured to generate an implied NL based input-which in some cases may correspond to the synthetic follow up queries mentioned previously-independent of any user explicit NL based input provided by a user of the client device 110. The implied input engine 114 may also be configured to submit an implied NL based input, optionally independent of any user explicit NL based input that requests submission of the implied NL based input; and/or cause rendering of search result(s) or a NL based output for the implied NL based input, optionally independent of any explicit NL based input that requests rendering of the search result(s) or the NL based output. For example, the implied input engine 114 can use one or more past or current contexts, obtained from the context engine 113, in generating an implied NL based input, determining where to submit the implied NL based input (e.g., to an LLM engine 141 or the aforementioned VLM engine 146), and/or in determining to cause rendering of search result(s) or a NL based output that is responsive to the implied NL based input.

In some implementations, the implied input engine 114 can automatically generate and automatically submit an implied query or implied prompt (e.g., including the synthetic follow up queries mentioned previously) based on the one or more past or current contexts. Further, the implied input engine 114 can automatically push the search result(s) or the NL based output that is generated responsive to the implied query or implied prompt to cause them to be automatically rendered or can automatically push a notification of the search result(s) or the NL based output, such as a selectable notification that, when selected, causes rendering of the search result(s) or the NL based output. Additionally, or alternatively, the implied input engine 114 can submit respective implied NL based input at regular or non-regular intervals, and cause respective search result(s) or respective NL based outputs to be automatically provided (or a notification thereof automatically provided). For instance, the implied NL based input can be "patent news" based on the one or more past or current contexts indicating a user's general interest in patents, the implied NL based input or a variation thereof periodically submitted, and the respective search result(s) or the respective NL based outputs can be automatically provided (or a notification thereof automatically provided). It is noted that the respective search result(s) or the respective NL based output can vary over time in view of, e.g., presence of new/fresh search result document(s) over time.

Further, the client device 110 and/or the NL based output system 120 can include one or more memories for storage of data and/or software applications, one or more processors for accessing data and executing the software applications, and/or other components that facilitate communication over one or more of the networks 199. In some implementations, one or more of the software applications can be installed locally at the client device 110, whereas in other implementations one or more of the software applications can be hosted remotely (e.g., by one or more servers) and can be accessible by the client device 110 over one or more of the networks 199.

Although aspects of FIG. 1 are illustrated or described with respect to a single client device having a single user, it should be understood that is for the sake of example and is not meant to be limiting. For example, one or more additional client devices of a user and/or of additional user(s) can also implement the techniques described herein. For instance, the client device 110, the one or more additional client devices, and/or any other computing devices of a user can form an ecosystem of devices that can employ techniques described herein. These additional client devices and/or computing devices may be in communication with the client device 110 (e.g., over the network(s) 199). As another example, a given client device can be utilized by multiple users in a shared setting (e.g., a group of users, a household, a workplace, a hotel, etc.).

The NL based output system 120 is illustrated in FIG. 1 as including a NL based input processing engine 140, a visual input processing engine 144, and a NL based output engine 150. Some of these engines can be combined and/or omitted in various implementations. Further, these engines can include various sub-engines. For instance, the NL based input processing engine 140 is illustrated in FIG. 1 as including a LLM engine 141 and a dialog context engine 142. Moreover, the visual input processing engine 144 is illustrated in FIG. 1 as including the aforementioned VLM engine 146. Similarly, some of these sub-engines can be combined and/or omitted in various implementations. Accordingly, it should be understood that the various engines and sub-engines of the NL based output system 120 illustrated in FIG. 1 are depicted for the sake of describing certain functionalities and are not meant to be limiting.

Further, the NL based output system 120 is illustrated in FIG. 1 as interfacing with various databases, such as LLM(s) database 141A, dialog context(s) database 142A, and VLM(s) database 146A. Although particular engines and/or sub-engines are depicted as having access to particular databases, it should be understood that is for the sake of example and is not meant to be limiting. For instance, in some implementations, each of the various engines and/or sub-engines of the NL based output system 120 may have access to each of the various databases. Further, some of these databases can be combined and/or omitted in various implementations. Accordingly, it should be understood that the various databases interfacing with the NL based output system 120 illustrated in FIG. 1 are depicted for the sake of describing certain data that is accessible to the NL based output system 120 and is not meant to be limiting.

In various implementations, NL based output system 120 can cause the LLM engine 141 to process, using an LLM stored in the LLM(s) database 141A, NL based input to generate a stream of LLM output that may be provided by NL based output engine 150. The LLM can include, for example, any LLM that is stored in the LLM(s) database 141A, such as PaLM, BARD, BERT, LaMDA, Meena, GPT, and/or any other LLM, such as any other LLM that is encoder-only based, decoder-only based, sequence-to-sequence based and that optionally includes an attention mechanism or other memory. The stream of LLM output provided to NL based output engine 150 can include, for example, a probability distribution over a sequence of tokens, such as words, phrases, or other semantic units, which are predicted to be responsive to the NL based input. Notably, the LLM can include billions of weights and/or parameters that are learned through training the LLM on enormous amounts of diverse data. This enables the LLM to generate the LLM output as the probability distribution over the sequence of tokens. In various implementations, NL based output system 120 may cause dialog context engine 142 to manage dialog contexts based on data stored in dialog context database 142A, including identifying new dialog contexts, shifting between existing dialog contexts, etc.

NL based output system 120 may also be configured to cause the VLM engine 146 to process, using a VLM stored in the VLM(s) database 146A, one or more modalities of input, including visual input (e.g., digital images), to generate a stream of VLM output. The VLM can include, for example, any VLM that is stored in the VLM(s) database 146A, such as pathways language and image model (PaLI), ALIGN, VisualBERT, VilBERT, ImageBERT, Pixel-BERT, UNITER, BLIP, OSCAR, VILT, LXMERT, CLIP, Florence, and/or any other VLM, such as any other VLM that is encoder-only based, decoder-only based, sequence-to-sequence based and that optionally includes an attention mechanism or other memory, fusion encoder-based, dual encoder-based, and/or a combination of both. The stream of VLM output provided to NL based output engine 150 can include, for example, a probability distribution over a sequence of tokens, such as words, phrases, or other semantic units, which are predicted to be responsive to the NL based input. Notably, the LLM can include billions of weights and/or parameters that are learned through training the LLM on enormous amounts of diverse data. This enables the LLM to generate the LLM output as the probability distribution over the sequence of tokens. In various implementations, NL based output system 120 may cause dialog context engine 142 to manage dialog contexts based on data stored in dialog context database 142A, including identifying new dialog contexts, shifting between existing dialog contexts, etc.

In some implementations, a stream of output generated by LLM engine 141 may be provided as all or part of an input prompt for VLM engine 146, or vice versa. Suppose a user submits an initial NL based query that is ambiguous. Data indicative of the ambiguous query (e.g., the text of the query, embedding(s) generated therefrom) may be assembled, e.g., by NL based input processing engine 140, into an LLM prompt. The LLM prompt may then be processed by LLM engine 141 using an LLM from database 141A to generate one or more follow up synthetic queries that solicit information that might disambiguate the initial query. The follow up synthetic queries (e.g., implied queries) can take various forms, such as textual queries, one or more embeddings, and so forth.

To the extent these synthetic follow up queries seek information about the user's environment, they may be assembled, e.g., by visual input processing engine 144, into a VLM prompt which may also include one or more images provided by, for instance, user input engine 111. The VLM prompt may then be processed by VLM engine 146 using a VLM from database 146A to generate VLM output that includes, for instance, information about a state of an environment, such as a room or area in which the user is located, or another environment about which the user has inquired. The state of the environment may include, for instance, items that are present, visual features of the environment and/or the items, arrangements (e.g., poses, locations) of those items within the environment, attributes of those items, and so forth. The VLM output may take various forms, such as text (e.g., "a TV hangs on the wall opposite a red sofa, which has a table in front of it", "the refrigerator contains a half gallon of milk, sandwich meat, cucumbers, strawberry yogurt, grapes, chicken breasts, and mayonnaise"), embedding(s), etc.

Data indicative of the state of the environment may be assembled, e.g., by NL based input processing engine 140, into another LLM prompt. In some implementations, NL based input processing engine 140 may also incorporate data indicative of the original ambiguous query into the LLM prompt as well. Additionally or alternatively, NL based input processing engine 140 may add to and/or replace parts of the ambiguous query with term(s) from the state of the environment to generate a disambiguated textual query, which can then be incorporated into the LLM prompt. In either case, the LLM prompt may be processed by LLM engine 141 using an LLM from database 141A (the same LLM or a different LLM) to generate content such as NL output that is responsive to the user's ambiguous query in the visual/environmental context determined by VLM engine 146.

In various examples described herein, separate LLMs and VLMs are used to generate context and assemble LLM prompts. However, this is not meant to be limiting. Some multi-modal LLMs can be used as VLMs and as text-only models. For example, a VLM such as PaLI may include a vision transformer that transforms digital image(s) to "visual words" that can then be processed, alone or in combination with NL input, by a downstream transformer encoder and/or decoder. Moreover, PaLI and other similar models may be used to process text alone, images alone, or any combination thereof. Accordingly, in some implementations, the same multi-modal model may be used as both a VLM and an LLM, rather than employing separate VLMs and LLMs.

Figure 2:
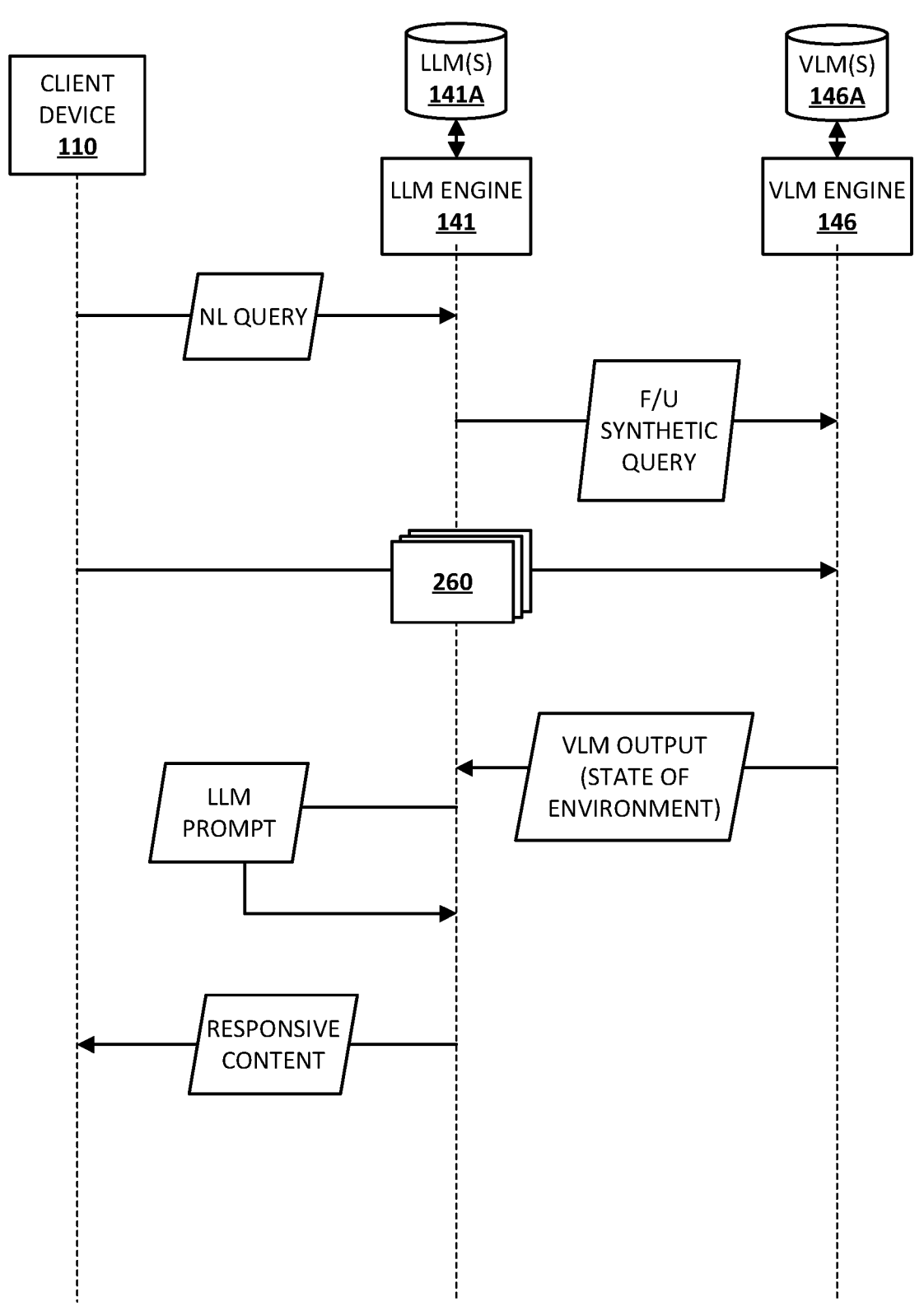
FIG. 2 schematically depicts an example of how various components may exchange data to facilitate multi-modal assistant engagement, in accordance with various implementations.

FIG. 2 schematically depicts an example of how client device 110, LLM engine 141 and VLM engine 146 may exchange data to facilitate multi-modal assistant engagement, in accordance with various implementations. Starting at top left, data indicative of a NL query (explicitly received or implied) may be provided by client device 110 to LLM engine 141. In some cases this NL input may be ambiguous or otherwise unresolvable without additional contextual information. One example of such an ambiguous NL query is from the working example described previously, "I need a good recipe for dinner tonight."

LLM engine 141 may process the data indicative of the NL query using an LLM from database 141A to generate a sequence of words or other items (e.g., embeddings) representing one or more follow up synthetic queries. The follow up synthetic quer(ies) may seek information such as contextual information that is usable to resolve or otherwise disambiguate the initial NL query. With the recipe request working example, for instance, follow up synthetic queries might include "What ingredients are detected in the refrigerator," "What ingredients are detected on the counter," "What ingredients are detected in the pantry," or "What ingredients were recently removed from the shopping list?"

With the first three synthetic follow up queries, at least, answers may be obtained by visual analysis of physical environment(s). Accordingly, in various implementations, the follow up synthetic quer(ies) may be assembled as part of a VLM prompt, e.g., along with digital image(s) 260 capturing one or more physical environments. While digital image(s) 260 are provided by client device 110 in this example, this is not meant to be limiting. In various implementations, the digital image(s) 260 may come from another source, such as ambient vision sensor(s) that are in the user's environment or in another environment of interest. In the latter case, for instance, the images may be obtained from vision sensors in other areas where surplus ingredients might be stored, such as an extra refrigerator in the garage, a root cellar, etc.

The assembled VLM prompt may then be processed by VLM engine 146 to generate VLM output. The VLM output may include, for instance, representation(s) of state(s) of environment(s) depicted in the digital image(s) 260. As noted previously, these representations may take the form of textual descriptions and/or lists of words naming or describing items detected in the environment, or embeddings representing the state of the environment. In the working recipe example, the state of the environment may include a list of ingredients such as chicken, spices, fruits, vegetables, etc., that were detected in one or more locations in which ingredients are monitorable using vision sensors. In the recipe request working example, the ingredients may include, for instance, chicken, oil, breadcrumbs, flour, spice(s), etc.

In some implementations, the VLM output may be provided to LLM engine 141. In various implementations, LLM engine 141 and/or NL based input processing engine 140 may assemble an additional LLM prompt that includes data indicative of the VLM output and data indicative of the original NL query. This additional LLM prompt may include, for instance, a rewrite of the initial NL query with words or phrases added or replaced to remove and/or reduce ambiguity. In the recipe working example, for instance, the additional LLM prompt may include data representative of the query, "I need a good chicken recipe for dinner tonight."

LLM engine 141 may then process this new LLM query using one or more LLMs from database 141A to generate additional LLM output. In some implementations, LLM engine 141 may use the same LLM that was used previously to process the original NL query. Additionally or alternatively, if that original LLM was trained specifically to generate follow up synthetic queries but not to respond to queries in general, LLM engine 141 may use a different LLM that is trained specifically to generate responsive content for users. At any rate, LLM engine 141 and/or NL based output engine 150 may provide responsive content to client device 110. In the recipe working example, for instance, the responsive content may include a step-by-step recitation of a chicken recipe, which may or may not include links to sources.

Figure 3:
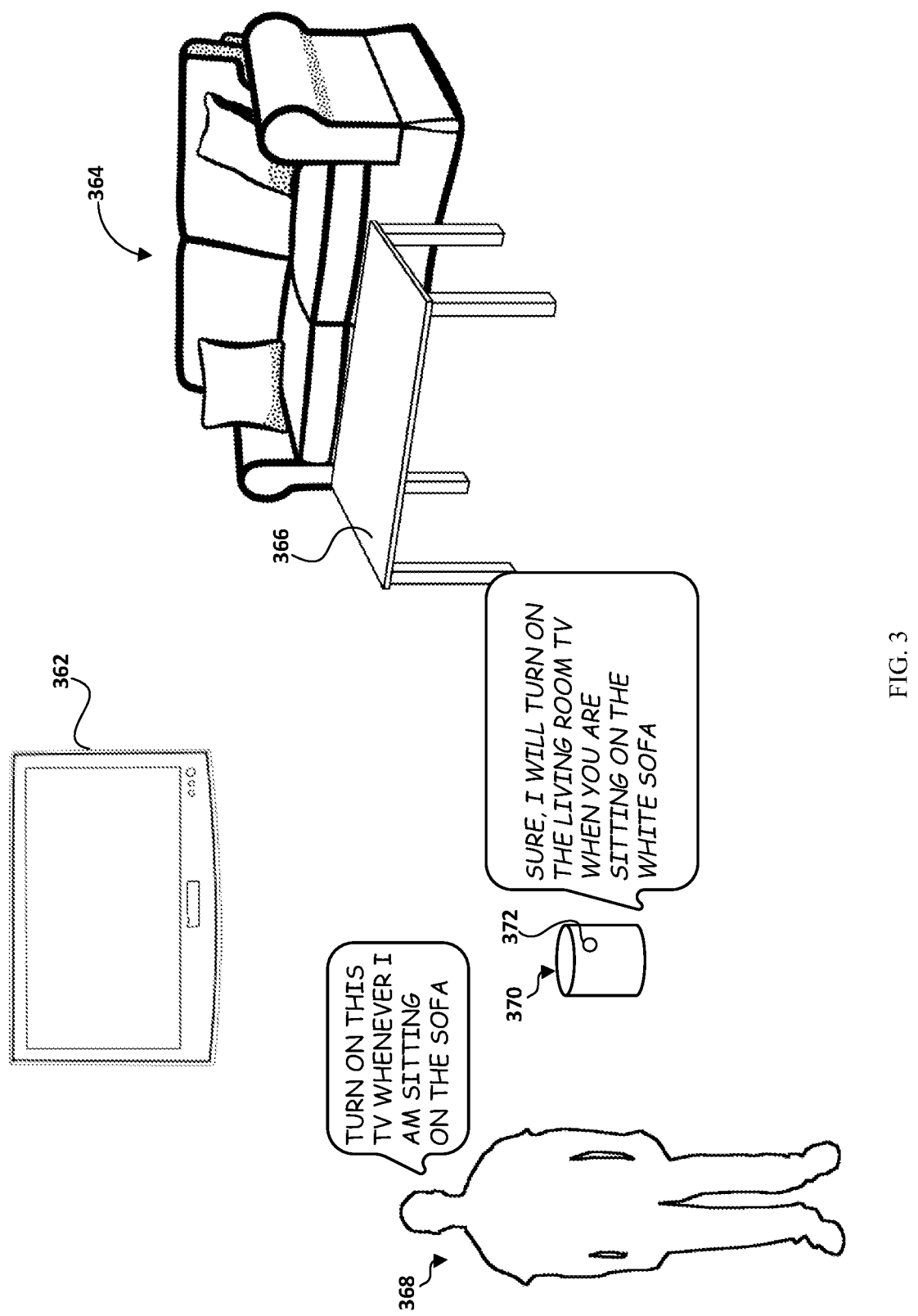
FIG. 3 schematically depicts an example scenario in which selected aspects of the present disclosure may be implemented.

FIG. 3 schematically depicts another example scenario in which selected aspects of the present disclosure may be implemented. In FIG. 3, a living room is depicted that includes a television (TV) 362, a sofa 364, and a coffee table 366. A user 368 is standing in the living room in proximity with an assistant device 370, which may be, for instance, an assistant-powered speaker and/or display that is equipped with a vision sensor 372. In this example, the user has issued the spoken query, "Turn on this TV whenever I am sitting on the sofa." In response, the assistant device provides an acknowledgement, "Sure, I will turn on the living room TV when you are sitting on the white sofa."

Figure 4:
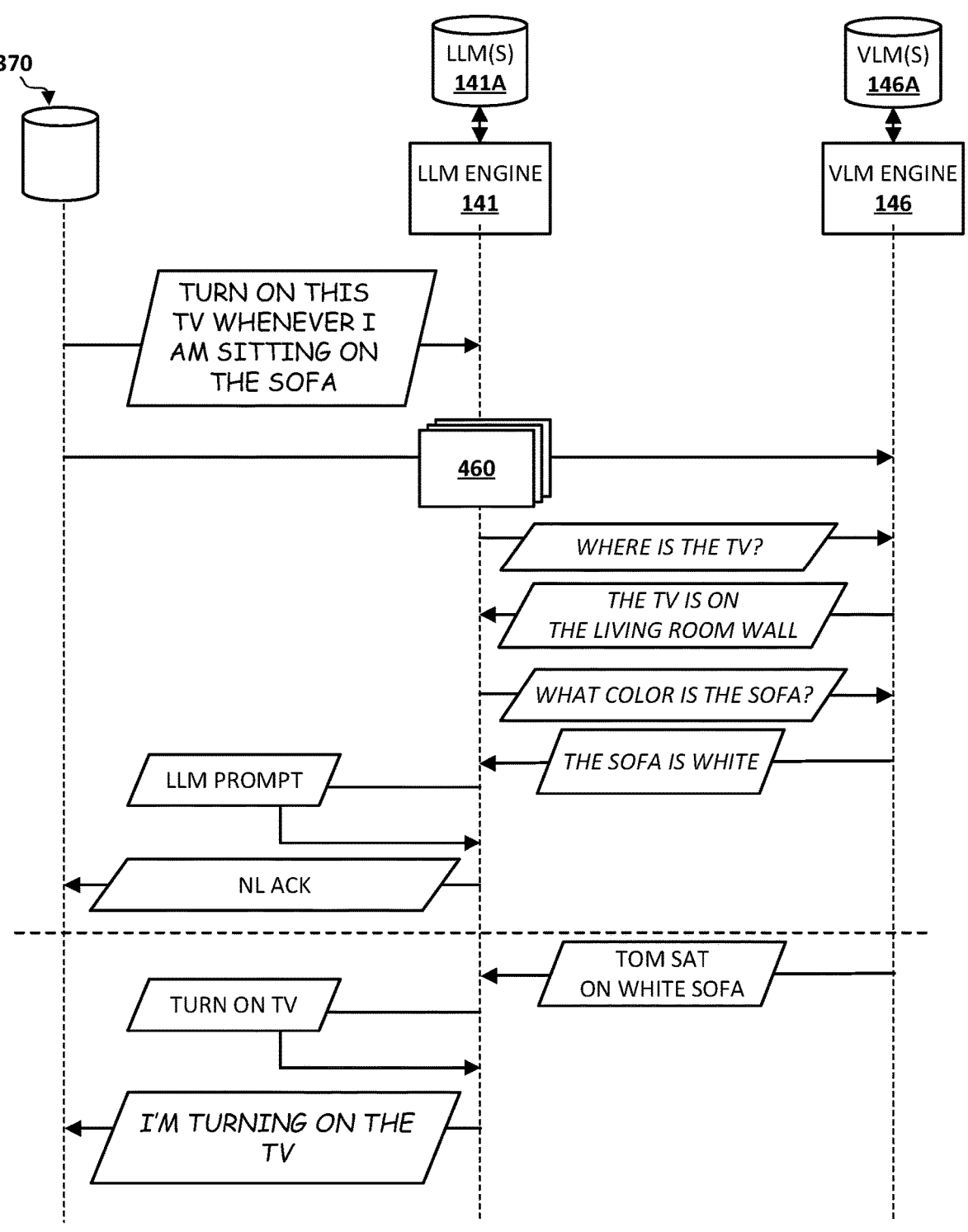
FIG. 4 schematically depicts an example of how various components may exchange data to facilitate multi-modal assistant engagement in the scenario of FIG. 3.

FIG. 4 schematically depicts an example of how various components may exchange data to facilitate the multi-modal assistant engagement in the scenario of FIG. 3. Starting at top left, assistant device 370 provides data indicative of the initial query ("Turn on this TV whenever I am sitting on the sofa"), such as the text of the query and/or embeddings thereof, to LLM engine 141. Meanwhile, digital image(s) 460 captured by vision sensor 372 or by another vision sensor (e.g., of a smart phone carried by user 368 or of another vision sensor deployed in the living room, on a robot that patrols and/or cleans the living room, etc.) may be provided to VLM engine 146.

LLM engine 141 may process the initial query based on an LLM from database 141A to generate one or more follow up synthetic queries. In FIG. 4, for instance, the follow up synthetic queries include "Where is the TV?" and "What color is the sofa?" These synthetic queries may be assembled into VLM prompt(s), e.g., by visual input processing engine 144, along with digital images 460. The VLM prompt(s) may be processed by VLM engine 146 to generate VLM output(s) that include data indicative of a state of the living room, such as "The TV is on the living room wall" and "The sofa is white."

As was the case in FIG. 2, these VLM output(s) may be assembled into additional LLM prompt(s), e.g., by NL based input processing engine 140. The additional LLM prompt(s) may then be processed by LLM engine 141 to generate a natural language response/acknowledgement ("ACK" in FIG. 4), such as "sure, I will turn on the living room tv when you are sitting on the white sofa."

In some implementations, assistant device 370 and/or one or more other components (e.g., visual input processing engine 144) may thereafter process digital image(s) captured of the living room—e.g., periodically or continuously (e.g., with user permission), and/or or in response to stimuli such as detected movements or presence—to generate VLM output(s) that include data indicative of a state of the living room. Sometime later (as illustrated by the horizontal dashed line, suppose the user ("Tom") sits on sofa 364. Tom's movement may trigger capture and processing, e.g., by visual input processing engine 144 (which may execute in whole and/or in part on assistant device 370 in some cases) of digital images using VLM(s) from database 146A. This may result in VLM output such as "Tom sat on white sofa" or, more generically, "a person sat on the white sofa." Data indicative of this VLM output may be assembled into another LLM prompt, e.g., by NL based input processing engine 140. The LLM prompt may then be processed by LLM engine 141 to generate LLM output, which may include, for instance, the NL output, "I'm turning on the TV." The LLM output may additionally or alternatively include one or more commands to turn on the television.

As demonstrated by FIGS. 3-4, in addition to providing NL output that is responsive to user queries, techniques described herein may also be used to facilitate interaction with and/or control of devices and/or appliances. For instance, television 362 in FIG. 3 may be one of a plurality of networked devices and/or appliances that collectively form a coordinated ecosystem of devices that are registered to and/or controlled by one or more users, such as user 368. In some implementations, when the television 362 was initially visually detected (e.g., in response to the synthetic follow up query, "where is the TV?"), the same coordinated ecosystem of devices may have been cross referenced to determine that the television is a member, and that the television can therefore be controlled by and/or interact with other devices of the coordinated ecosystem, such as assistant device 370.

Figure 5:
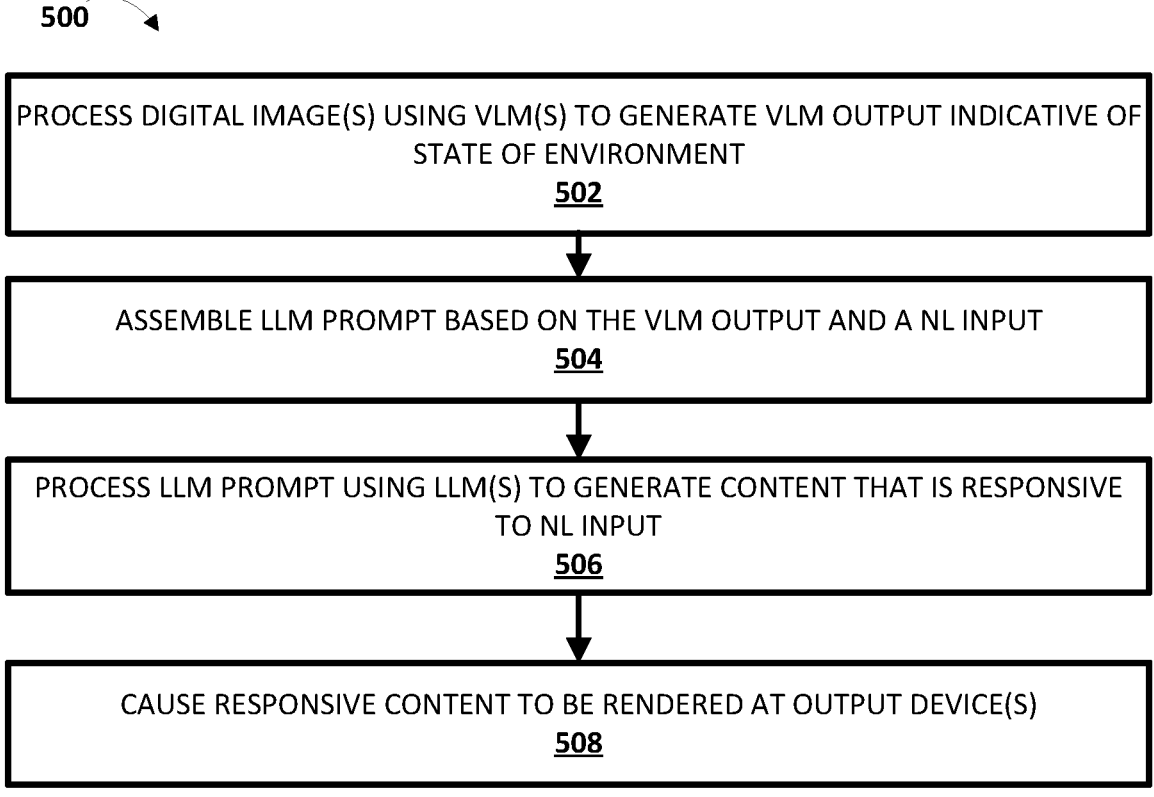
FIG. 5 depicts a flowchart illustrating an example method of practicing selected aspects of the present disclosure, in accordance with various implementations.

FIG. 5 depicts a flowchart illustrating an example method of practicing selected aspects of the present disclosure, in accordance with various implementations. For convenience, the operations of method 500 are described with reference to a system that performs the operations. This system may include one or more processors, memory, and/or other component(s) of computing device(s). Moreover, while operations of the method 500 are shown in a particular order, this is not meant to be limiting. One or more operations may be reordered, omitted, and/or added.

At block 502, the system, e.g., by way of visual input processing engine 144, VLM engine 146, and/or context engine 113, may process digital image(s) (e.g., 260, 460) using one or more VLMs from database 146A to generate VLM output indicative of a state of an environment. VLM output indicative of a state of an environment can include text, embeddings, visual output (e.g., a map of a room with its furniture), or any combination thereof that represents a state of an environment, such as an area, a room, a surface, etc. In FIG. 4, for instance, the VLM output generated in response to the user's query included the location of television 362 in the living room and a color of sofa 364. Other VLM output generated in FIG. 4 included VLM output indicating that the user had seated himself on sofa 364. In the latter case, image(s) may be captured and/or processed by VLM engine 146 periodically, continuously, on demand, or in response to triggering events such as presence detection, user recognition (e.g., facial recognition, various biometrics), voice recognition, motion, scheduled times for images to be captured, and so forth.

As noted above, image(s) may be captured and/or processed by VLM engine 146 to determine environmental states at the behest or, or at least the permission of, user(s). As one non-limiting example, a user may issue a command that between the hours of 3 PM and 6 PM, digital images be captured (e.g., every sixty seconds) of a room that includes a pet bowl. The user could, for instance, also provide an instruction that if the pet bowl is detected to be empty, e.g., by VLM engine 146 using a VLM from database 146A, that some automated mechanism, such as a mobile robot, remote-controlled pet bowl filling apparatus, etc., refill the pet bowl with food.

Referring back to FIG. 5, at block 504, the system, e.g., by way of NL based input processing engine 140, may assemble an LLM prompt based on the VLM output and an NL input. For example, a user may issue a query about an environment, and the system may leverage the already-obtained VLM as additional context that can be added to the LLM prompt, along with data indicative of the user's query (e.g., the original text or embedding(s)).

At block 506, the system, e.g., by way of LLM engine 141, may process the LLM prompt using one or more LLMs from database 141A to generate an LLM output that represents, conveys, or is otherwise indicative of content that is responsive to the NL input. At block 508, the system, e.g., by way of NL based output engine 150 and/or rendering engine 112, may cause the content generated at block 506 to be rendered at one or more output devices, such as a display and/or speaker of client device 110. In some implementations, the system may additionally or alternatively provide other types of output or downstream processing. For instance, the system may operate one or more devices and/or appliances based on command(s) found in the final LLM output.

FIG. 6 depicts a flowchart illustrating another example method of practicing selected aspects of the present disclosure, in accordance with various implementations. For convenience, the operations of the method 600 are described with reference to a system that performs the operations. This system may include one or more processors, memory, and/or other component(s) of computing device(s). Moreover, while operations of the method 600 are shown in a particular order, this is not meant to be limiting. One or more operations may be reordered, omitted, and/or added.

At block 602, the system, e.g., by way of user input engine 111, may receive an ambiguous natural language input. In the working example described previously, the user asked, "I need a good recipe for dinner tonight." At block 604, the system, e.g., by way of LLM engine 141, may process the ambiguous natural language input using one or more LLMs to generate synthetic follow-up quer(ies) that seek information that is usable to resolve the ambiguous natural language input. In the working example, the synthetic follow up quer(ies) may include, for instance, queries about ingredients that are detected in the kitchen or other areas where ingredients are stored.

At block 606, the system, e.g., by way of visual input processing engine 144, may assemble a VLM prompt based on the synthetic follow-up query and one or more digital images. At block 608, the system, e.g., by VLM engine 146, may process the VLM prompt using one or more VLMs from database 141A to generate VLM output indicative of a state of the environment.

At block 610, the system, e.g., by way of NL based input processing engine 140, may assemble an LLM prompt based on the VLM output and the ambiguous natural language input. At block 612, the system, e.g., by way of LLM engine 141, may process the LLM prompt using one or more of the LLMs from database 141A to generate content that is responsive to the ambiguous natural language input. Block 614 may proceed similarly to block 508 in FIG. 5.

At block 614, the system may cause the content that is responsive to the ambiguous natural language input to be rendered at one or more output devices, similar to block 508.

Figure 7:
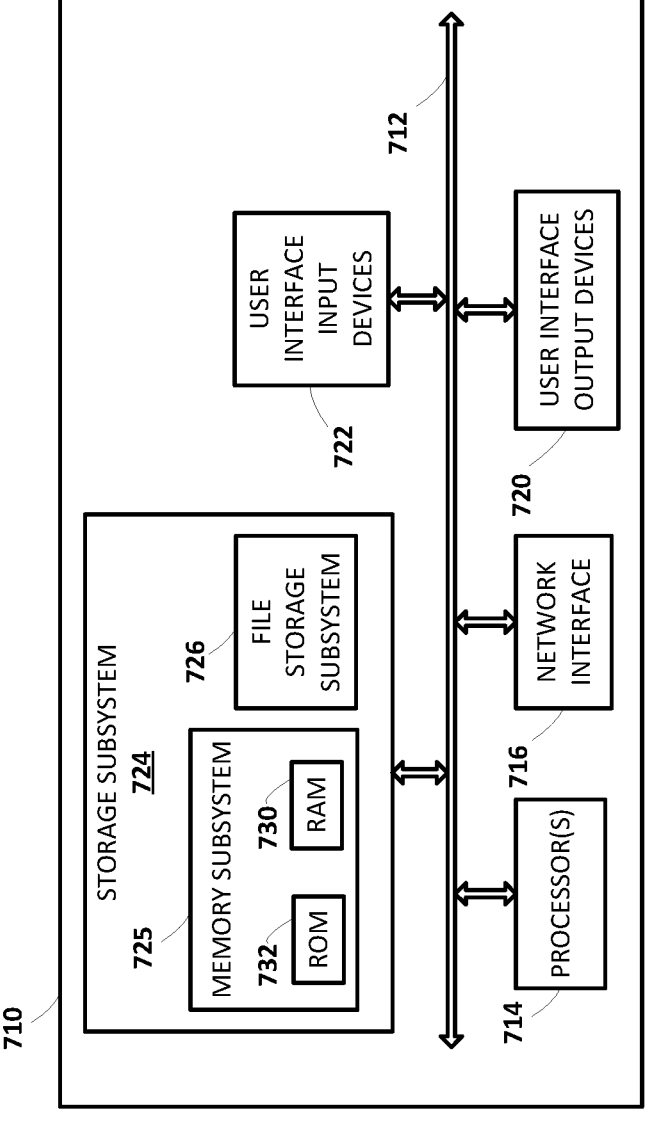
FIG. 7 depicts an example architecture of a computing device, in accordance with various implementations.

Turning now to FIG. 7, a block diagram of an example computing device 710 that may optionally be utilized to perform one or more aspects of techniques described herein is depicted. In some implementations, one or more of a client device, cloud-based automated assistant component(s) or other cloud-based software application component(s), and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods disclosed herein, as well as to implement various components depicted in FIGS. 1, 2, and 4.

These software modules are generally executed by processor 714 alone or in combination with other processors. Memory 725 used in the storage subsystem 724 can include a number of memories including a main random-access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges.

The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem 712 may use multiple buses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors and comprising:
  receiving one or more digital images of an environment;
  processing an ambiguous natural language input received from a user using one or more large language models (LLMs) to generate a synthetic follow-up query, wherein the synthetic follow-up query is derived from the ambiguous natural language input and seeks information about the environment of the user that is usable to resolve the ambiguous natural language input;
  assembling a vision language model (VLM) prompt to include the one or more digital images and the synthetic follow-up query;
  processing the VLM prompt using one or more VLMs to generate VLM output indicative of a state of the environment;
  assembling an LLM prompt based on the VLM output and the ambiguous natural language input, wherein the assembling includes assembling one or more terms from the VLM output into the ambiguous natural language input to provide the LLM prompt;

processing the LLM prompt using one or more of the LLMs to generate content that is responsive to the ambiguous natural language input; and causing the content that is responsive to the ambiguous natural language input to be rendered at one or more output devices.

2. The method of claim 1, wherein the synthetic follow-up query seeks information about one or more items that are present in the environment.

3. The method of claim 2, wherein the information comprises one or more physical attributes of one or more of the items that are present in the environment.

4. The method of claim 2, wherein the information comprises one or more locations of one or more of the items within the environment.

5. The method of claim 1, further comprising detecting, based on one or more sensor signals, that an individual is present in the environment, wherein the one or more digital images are processed, using one or more of the VLMs, in response to the detecting.

6. The method of claim 1, wherein the LLM prompt comprises embeddings generated from the VLM output indicative of the state of the environment and the ambiguous natural language input.

7. The method of claim 1, wherein the LLM prompt comprises a sequence of natural language tokens assembled from the VLM output indicative of the state of the environment and the ambiguous natural language input.

8. A method implemented using one or more processors and comprising:

receiving an ambiguous natural language input and one or more digital images of an environment;

processing the ambiguous natural language input using one or more large language models (LLMs) to generate a synthetic follow-up query, wherein the synthetic follow-up query is derived from the ambiguous natural language input and seeks information that is usable to resolve the ambiguous natural language input;

assembling a vision language model (VLM) prompt based on the synthetic follow-up query and the one or more digital images of the environment;

processing the VLM prompt using one or more VLMs to generate VLM output indicative of a state of the environment;

assembling an LLM prompt based on the VLM output and the ambiguous natural language input, wherein the assembling includes assembling one or more aspects of the VLM output into the ambiguous natural language input to provide the LLM prompt;

processing the LLM prompt using one or more of the LLMs to generate content that is responsive to the ambiguous natural language input; and causing the content that is responsive to the ambiguous natural language input to be rendered at one or more output devices.

9. The method of claim 8, wherein the synthetic follow-up query seeks information about one or more items that are present in the environment.

10. The method of claim 9, wherein the information comprises one or more physical attributes of one or more of the items that are present in the environment.

11. The method of claim 9, wherein the information comprises one or more locations of one or more of the items within the environment.

12. A system comprising one or more processors and memory storing instructions that, in response to execution, cause the one or more processors to:

receive one or more digital images of an environment and process an ambiguous natural language input received from a user using one or more large language models (LLMs) to generate a synthetic follow-up query, wherein the synthetic follow-up query is derived from the ambiguous natural language input and seeks information about the environment of the user that is usable to resolve the ambiguous natural language input;

assemble a vision language model (VLM) prompt to include the one or more digital images of the environment of the user and the synthetic follow-up query;

process the VLM prompt using one or more VLMs to generate VLM output indicative of a state of the environment;

assemble an LLM prompt based on the VLM output and the ambiguous natural language input, wherein the instructions to assemble include instructions to assemble one or more terms from the VLM output into the ambiguous natural language input to provide the LLM prompt;

process the LLM prompt using one or more of the LLMs to generate content that is responsive to the ambiguous natural language input; and cause the content that is responsive to the ambiguous natural language input to be rendered at one or more output devices.

13. The system of claim 12, wherein the synthetic follow-up query seeks information about one or more items that are present in the environment.

14. The system of claim 13, wherein the information comprises one or more physical attributes of one or more of the items that are present in the environment.

15. The system of claim 13, wherein the information comprises one or more locations of one or more of the items within the environment.

16. The system of claim 12, further comprising instructions to detect, based on one or more sensor signals, that an individual is present in the environment, wherein the one or more digital images are processed, using one or more of the VLMs, in response to the detecting.

* * * * *